(12) United States Patent
Cox

(10) Patent No.: US 10,899,106 B1
(45) Date of Patent: Jan. 26, 2021

(54) THREE-DIMENSIONAL, KNITTED, MULTI-SPECTRAL ELECTRO-MAGNETIC DETECTION RESISTANT, CAMOUFLAGING TEXTILE

(75) Inventor: Philip R. Cox, Madison, AL (US)

(73) Assignee: TELEDYNE BROWN ENGINEERING, INC., Thousand Oaks, CA (US)

( * ) Notice: Subject to any disclaimer, the term of this patent is extended or adjusted under 35 U.S.C. 154(b) by 1826 days.

(21) Appl. No.: 08/596,622

(22) Filed: Feb. 5, 1996

(51) Int. Cl.
| | |
|---|---|
| *D04B 21/20* | (2006.01) |
| *B32B 7/027* | (2019.01) |
| *B32B 7/05* | (2019.01) |
| *B32B 5/02* | (2006.01) |
| *B32B 5/26* | (2006.01) |
| *D03D 1/00* | (2006.01) |

(52) U.S. Cl.
CPC ............. *B32B 5/26* (2013.01); *B32B 5/026* (2013.01); *B32B 7/027* (2019.01); *B32B 7/05* (2019.01); *D04B 21/20* (2013.01); *B32B 2459/00* (2013.01)

(58) Field of Classification Search
CPC ....... B32B 2459/00; B32B 7/05; B32B 7/027; B32B 5/26; B32B 5/026; D03D 1/0047; D04B 21/20

USPC .................. 428/1, 3, 224, 246, 86; 342/1, 4
See application file for complete search history.

(56) References Cited

U.S. PATENT DOCUMENTS

| | | | | |
|---|---|---|---|---|
| 3,887,920 A | * | 6/1975 | Wright et al. | 343/18 A |
| 4,034,375 A | | 7/1977 | Wallin | 343/18 A |
| 4,064,305 A | | 12/1977 | Wallin | 428/246 |
| 4,467,005 A | | 8/1984 | Pusch et al. | 428/111 |
| 4,528,229 A | | 7/1985 | Gottlieb | 428/85 |
| 4,606,848 A | * | 8/1986 | Bond | 252/511 |
| 4,671,988 A | | 6/1987 | Dowell et al. | 428/226 |
| 4,728,554 A | * | 3/1988 | Goldberg et al. | 428/113 |
| 4,812,854 A | | 3/1989 | Boan et al. | 343/897 |
| 5,077,556 A | | 12/1991 | Aisslinger | 342/3 |
| 5,110,651 A | * | 5/1992 | Massard et al. | 428/105 |
| 5,284,031 A | | 2/1994 | Stoll et al. | 66/64 |
| 5,312,678 A | * | 5/1994 | McCullough, Jr. et al. | 428/225 |
| 5,348,789 A | * | 9/1994 | Hellwig | 428/135 |
| 5,385,036 A | | 1/1995 | Spillane et al. | 66/87 |
| 5,474,837 A | * | 12/1995 | Duke, Jr. et al. | 428/236 |
| 5,488,371 A | * | 1/1996 | Targove | 342/1 |
| 5,537,116 A | * | 7/1996 | Ishino et al. | 342/1 |

* cited by examiner

*Primary Examiner* — Elizabeth C Imani
(74) *Attorney, Agent, or Firm* — K&L Gates LLP

(57) ABSTRACT

An easily handled, lightweight, three-dimensional camouflage material relying on an outer fabric layer and an inner fabric layer separated by an intermediate pile for effective multi-spectral, electromagnetic detection suppression in the visual, near infrared, thermal infrared, microwave, and radar wavebands is provided herein.

18 Claims, 2 Drawing Sheets

THREE-DIMENSIONAL, KNITTED, MULTI-SPECTRAL ELECTRO-MAGNETIC DETECTION RESISTANT, CAMOUFLAGING TEXTILE

TECHNICAL FIELD

The present invention is directed to camouflaging material and, particularly, textile fabric composed of spaced multiple offset layers for improving electromagnetic detection resistance over multiple electromagnetic bands.

BACKGROUND OF THE INVENTION

The art of camouflaging fabrics is well established. Many of such fabrics have been devised to defeat detection of infrared and radar sensors.

However, technology has become increasingly sophisticated where it can detect both electromagnetic emission and reflection from a site. Consequently, to defeat detection, camouflage needs to conceal objects from a variety of sensors tuned to any number of visual, near infrared, thermal, and radar wavebands.

The oldest form of camouflage is visual—colored and/or patterned by dying, printing, or garnishing with appropriate materials. The pattern and coloration are chosen to blend with the environment in which it is to be used (woodland, grassland, desert, arctic, etc.). Typically, such material covers an object so that a majority ambient light is reflected from the net and not the underlying object. As a result, it becomes more difficult for an observer qualitatively and quantitatively to detect and identify the camouflaged subjects.

More recently, microwave/radar waveband camouflage materials have become necessary to defeat electromagnetic detection by infrared ("IR") and microwave/radar detection sensors. Typically, "EM" camouflage materials rely on carbon, metal, or electrically conductive fibers to attenuate or scatter electromagnetic radiation. Attenuation techniques primarily rely on short carbon fibers because carbon fibers absorb electromagnetic energy. Scatter techniques are based on conductive fibers that provide a conductive dipole effect, e.g., conductive filaments or thin films, <10 µm, fabricated to intercept and scatter specific radar frequencies. The conductive filaments are incorporated into the fabric yarn or the films applied to the camouflage material as coatings/garnish/fabric. The conductive fibers are not uniform, having different dipole lengths to provide effective concealment against different frequencies over microwave/radar bands corresponding to the fiber lengths.

While the EM camouflaging materials rely on a combination of physical design and construction parameters, such prior art, however, does not always provide effective concealment by attenuating thermal signatures. Also many IR type fabrics effectively intercept, diffuse, and re-radiate a concealed object's heat. However, the fabric, itself, may possess a unique EM signature due to a radiation profile different from the surroundings, i.e., because it may re-radiate energy at a lower or higher rate than either the object and its surroundings. Therefore, the camouflage material may be detectable as an EM sink (cold spot)—appearing cooler than the surroundings when viewed by thermal imaging devices and weapons.

An equally significant but an opposite problem may arise in the prior art. It is well known that certain IR camouflaging textiles are subject to solar loading. In sunlight, the textiles absorb solar energy and re-radiate the absorbed heat energy in a series of thermal infrared bands. Consequently, the re-radiation signature may betray the presence of camouflaging and increasing the likelihood of detection by observers using thermal imaging sensors. Thus, such prior art materials fail to adequately conceal and are partially transparent in the near/thermal infrared spectrum.

Examples of prior art detection defeating fabrics (e.g., IR tarps, and the like) are disclosed in U.S. Pat. No. 4,528,229 describing a camouflage material to protect against radar observation that relies on randomly distributed carbon or metal fibers in the filaments to promote a random EM return signal.

Another patent, U.S. Pat. No. 5,077,556, provides a fabric canopy formed, in part, by coated filaments for screening an object from thermally emitted waves and electromagnetic waves (microwave/radar). The canopy employs multiple textile sheets spaced apart by a support fabric, i.e., a spacer, which forms a center space.

U.S. Pat. No. 4,034,375 describes a tri-layer, flexible fabric, laminated camouflage material. The layers are 1) non-woven, electrically nonconductive polymer, 2) a second layer of the same, and 3) an intermediate layer formed of arrays of two sets of parallel strands. The first set is spun from polyamide or polyester fibers and the second from electrically conductive fibers, such as stainless steel or graphite. The second array form parallelogram openings with the first array.

The foregoing examples of the prior art address certain of the technical problems associated with EM camouflaging textiles but do not provide a solution to other technical problems and do not resolve logistical problems.

Handling of prior art camouflaging materials provides a set of more mundane but no less significant logistical problems. Some prior art materials are very bulky and heavy, thereby, creating transport and deployment problems. For fabrics relying on garnish structures to defeat EM detection, the fabric surface tends to be irregular (not uniform), which increases the bulk/volume. Furthermore, with telltales and other surface profiling features, handling may be complicated due to snagging on deployment by the profiling structures. Snagging can become a serious problem, for example, when a net is arranged over objects with multiple irregular surfaces such as a helicopter.

In addition to the volume problem referred to above, some prior art camouflage systems are known to weigh on the order 8.0 oz per square yard. Given the large amount of fabric that may be required to conceal just one site (e.g., military ground and air vehicles), the substantial weight and bulk of the fabric create transportation and deployment problems.

Furthermore, in some instances, it is necessary to utilize a plurality of fabrics to achieve an adequate degree of multi-spectral concealment. Such practices increase costs, require excessive shipping and handling problems, and may not serve to provide the desired multi-spectral camouflaging. Even when using a plurality of camouflage netting, low-emissivity materials for IR typically are highly reflective in the visual band (mirror-like). To overcome this defect, the low emissivity material may be coated to reduce optical detection. However, such coatings, themselves, may lead to solar loading. Thus, a typical IR-tarp method may require the deployment of two separate nets, and, depending on the particular net used, still may be subject to the above shortcomings.

Finally, it is known that certain facilities rely on specific groups of thermal and radar frequencies. Therefore, in such cases to promote concealment, it may be advantageous to "tune" the camouflage fabric to those frequency ranges instead of providing random, undefined "wide" band protection using coatings and fibers of multiple lengths, as generally contemplated by the prior art.

It is clear that the prior art does not provide a system using prior art that simultaneously provides effective multi-spectral camouflaging, is lightweight, possesses substantial dimensional uniformity, generally avoids snagging, and simultaneously enhances detection resistance in the visual, thermal, and selective RF frequencies based.

SUMMARY OF THE INVENTION

It is an object of the present invention to overcome the problems in the prior art.

Another object of this invention is to provide an improved camouflaging fabric.

A further object of this invention is to provide a novel camouflaging fabric that, at once, provides improved concealment from detection in the visible, infrared, and radio frequency spectrums.

Still another object of this invention is to provide a camouflage material that is relatively lightweight and possesses a substantially uniform structure to facilitate transport, handling and deployment in the field.

Another object of this invention is to provide an electromagnetic camouflage material based on a three dimensional knit pattern that absorbs or scatters electromagnetic radiation of selected frequencies.

Still a further object of this invention is to provide a three-dimensional textile capable of concealment from detection in the visible, infrared and radar frequency bands which can incorporate desirable features of prior art materials.

A further object of this invention is to provide a camouflaging method using a novel, three-dimensional textile resistant to detection in the visible, infrared and radar frequency bands.

Still a further object of this invention is to provide a method of making a novel, three-dimensional textile resistant to detection in the visible, infrared and radar frequency bands.

These and other objects are satisfied by a camouflage textile providing multi-spectral electromagnetic detection resistance, comprising:

first knit textile sheet defined by a first selected pattern of fibers, said first textile sheet including a visible pattern intended to maximize optical characteristics matching with an ambient environment to minimize the probability of visual observation, said pattern forming a grid of selected dimensions;

a second textile sheet generally parallel to, coextensive with, and spaced apart from the first sheet, said second textile sheet being defined by a second selected pattern;

a third layer connecting to a separating the first and second knit sheets where said textile possesses a three dimensional configuration, said third layer comprising fibers possessing sufficient stiffness to maintain adequate separation between the first and second sheets upon deployment to permit air convection between said first and second textile sheets defining opens grids enabling diffusion of infrared radiation; and an RF detection attenuating means for minimizing detection by RF sensors.

The invention herein is intended to provide an easily handled, lightweight, multi-spectral, electromagnetic suppressing camouflage material effective in the visual, near infrared, thermal infrared, microwave, and radar wavebands without requiring the use of special low-emissivity coatings.

This invention shares the same physical laws followed by some of the prior art low emissivity camouflaging materials—Planck's Law:

$$E(T) = EOT^4$$

where E is the emissivity of the object material, O is the Stefan-Boltzman constant, and T is the absolute temperature of the object. It has been a common assumption in the past that the above relationship is the only one governing infrared radiation detection with infrared sensors. This assumption has lead to the further assumption that the thermal signature of an object could be reduced only by reducing the temperature or emissivity of the object. This assumption is wrong. Thermal signature sensing is actually governed by the quantity of heat transferred from the object to the thermal sensor. The foregoing relationship is contained in such transfer but the heat transfer, Q, from a target is governed by the relationship:

$$Q = FA_c E_g$$

where F is the shape factor between an entrance aperture of the sensor and the object, $A_c$ is the projected radiant area of the object, and $E_g$ is the radiant luminosity of the object given by Plank's law. The instant invention exploits control of the other two variables in Plank's law—shape factor and radiant area. To provide this capability, the invention relies on geometry of composite fabrics for its predominate thermal camouflage effects. The fabric may also include conventional low emissivity materials to enhance concealment.

The fabrics of this invention, when knitted, embody three or more yarns in intertwined layers constructed in a selected geometric three-dimensional arrangement. Preferably, both the exposed surface and the unexposed surfaces are substantially smooth and uniform but readily adapted for patterning or applied coloration to achieve the desired camouflage effect.

In the context of microwave/radar concealment, by engineering the fiber composition and length of the particular threads or yarns, this invention also provides for attenuation of not only incoming energy but also a discrete quantum of reflected radar energy.

The invention herein, therefore, exhibits camouflage effect over the electromagnetic spectrum: visual, near infrared, radar, and thermal infrared not like the prior art which typically ignores the thermal infrared bands.

Given the following enabling description of the drawings, the inventive camouflage fabric should become evident to a person of ordinary skill in the art.

DETAILED DESCRIPTION OF THE PREFERRED EMBODIMENT

Figure 1:
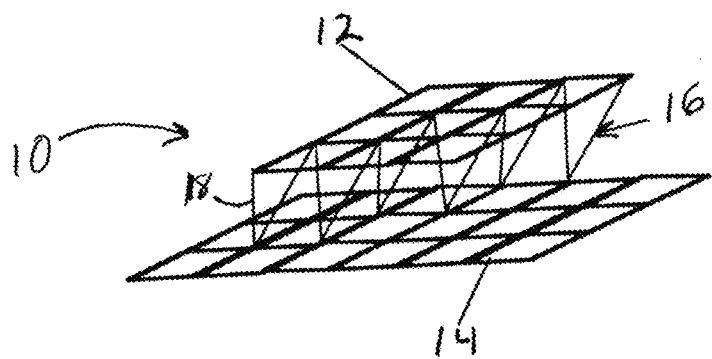
FIG. 1 is a cut-away perspective view of an inventive camouflaging fabric according to the invention.

In FIG. 1 a camouflaging textile 10 according to the invention is depicted. The textile 10 is a fabric material relying primarily on its geometry for multi-spectral electromagnetic radiation camouflaging effects. The textile fabric 10 including an upper generally planar sheet 12 formed of a fabric that can be knit, woven or formed of bonded fibers and a second, lower generally planar sheet 14 of selected fabric. Preferably, the fabric is woven or knit. For reference orientation purposes herein, upper sheet refers to that sheet subject to exposure and lower sheet refers to that face of the textile closest to the underlying, concealed area/objects.

The upper sheet 12 and lower sheet 14 are substantially parallel and are connected to each other by a third interposed layer 16 formed from an intertwined yarn/pile 18 which possess adequate stiffness to maintain a substantially constant spacing between the first and second sheet. The pile yarn 18 serves to preserve the predetermined separation of the sheets whereby the knit fabric 10 of this invention may be used as conventional netting, tarps, canopies, uniforms, and the like. The composition of the yarns (pile or fabric) governs the strength of the fabric 10. The use of monofilament or multi-filament yarn in the faces both strengthens and stiffens the fabric. The use of spun yarns particularly in the pile 18, will tend to soften the fabric rendering it more flexible.

Figure 2:
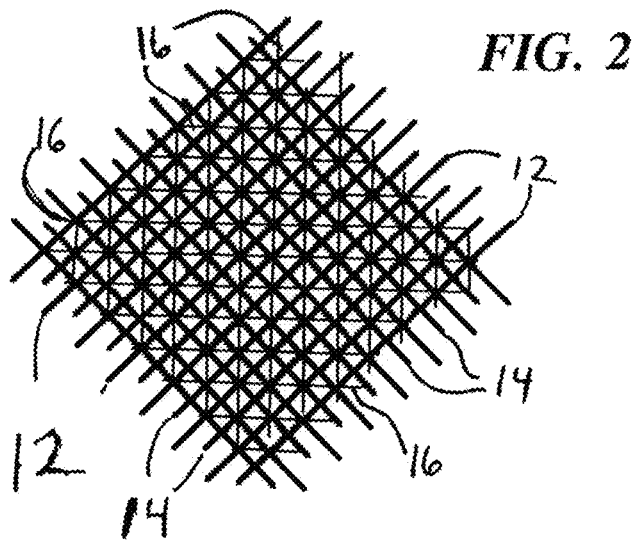
FIG. 2 is an orthogonal view of fabric depicted in FIG. 1.

In FIG. 2, the front sheet 12 and the back sheet 14 are shown as having a pattern of a selected ratio (as illustrated substantially identical) but are offset from each other by a select amount (as illustrate, center offset). As a result, when viewing the fabric from an angle normal to the plane of the sheets, the corners of the back sheet 14 appear in the center of the open spaces of the front sheet 12. Likewise, the convergence/corners of the front sheet 12 appear in the center of the open spaces of the back sheet 14. The pile yarns of the interposed third layer 16 connect the convergence/ respective corners of the front and back sheets.

To prevent visual detection, the upper sheet preferably includes a pattern of dyed yarn or silkscreening of an appropriate camouflage color. Because the surface of textile 10 is substantially uniform, it lends itself to application of camouflage patterns by conventional printing techniques, e.g., transfer or silkscreen methods. Furthermore, as a result of the depth and multi-layer construction, little or no pattern "bleed through" (is visually detectable) relative to the other face.

The camouflage colors should be adapted for the intended environment—green (jungle), tan (desert), or white (arctic), for instance. In considering the selection of colors and the intended environment for the camouflage textile of this invention, the structure of the textile 10, itself, may contribute to the efficacy of the visual masking of the upper sheet because the pile yarn of the third layer 16 shadows and reduces the effective brightness of the upper layer. To maximize visual concealment, it may also be desirable to use dyed yarn (tan, grey, etc.) in forming the second sheet. The pile yarn of connecting layer 16 preferably is of a neutral (black or grey) color in order to prevent significant contribution to visually perceived color for either sheet.

The inventive material also provides radar wave detection attenuation by relying on several possible synergistic elements. For example, using magnetic particles, noncontinuous metal or metallized filaments, carbonized yarns, carbon filaments, or conductive dipoles in the yarns contribute to reduce the probability of RF detection by attenuation or scattering of the incident electromagnetic wave. Where both faces are composed of spun yarns incorporating radar conductive or absorptive filaments, and particularly, carbonized polyester monofilament as the pile yarn, the resulting fabric exhibits a substantially greater radar camouflage effect. Moreover, the textile of this invention may be "tuned" to assist in concealment from radar waves by sizing the knitted layers, offsetting the layers (as illustrated) by one half the width of their pattern.

The thermal camouflage performance of the instant invention also relies on a combination of elements. First, the fabric 10 is more opaque to thermal radiation than traditional 2-dimensional (flat), knitted or open-woven fabrics. The increased opacity increases the occlusion of thermally-radiating objects stationed below the fabric 10. There is a significant reduction in thermal radiation through the fabric due to the less direct path provided by the spaced multiple layers. As a result of interstitial spaces created by the separated yarns, thermal energy is attenuated by dissipation through the back face 14 and pile yarns 18. Solar energy effects are also reduced because of the depth of the fabric occluded part of the yarns 18 from direct exposure to direct solar radiation.

Figure 3:
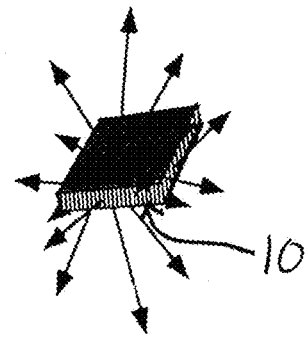
FIG. 3 is a stylized depiction of the radiant energy diffusion pattern provided by the fabric of FIG. 1.

In effect, the yarns of the upper face 12 and the upper part of the pile yarns 18 shade the back face 14 which prevents significant solar loading. Furthermore, as illustrated in FIG. 3, the depth of the fabric 10 provided by the length and stiffness of the pile yarns 18, functionally increase the volume for heat to be re-radiated randomly away from the upper surface of the fabric 10 and the interposed, spaced insulation layer 16 promotes convective dissipation of heat to provide effective thermal anti-detection. The three-dimensional structure of fabric 10 provides for the entire fabric to be surrounded by air and to permit relatively unencumbered air circulation in and around the fabric and between the fabric layers. The result mimics natural convective cooling that substantially corresponds to the ambient surroundings.

The ambient conditions in which the fabric 10 is intended will determine, in part, the effective length of the pile yarns 18. The greater the degree of thermal concealment, the greater the need for a deeper fabric (the longer the intermediate yarns 18). For example, in arctic conditions, some thermal signatures are easier to detect. Therefore, a longer pile is recommended. The apparent emissivity of the fabric can be tailored to fit different camouflage backgrounds by using lower emissivity yarns for the pile.

Figure 4:
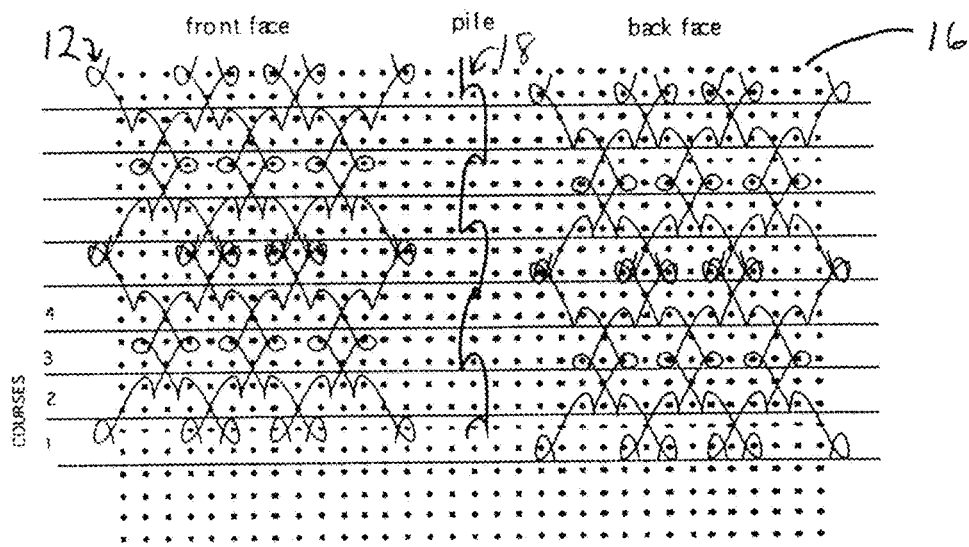
FIG. 4 represents a preferred knit pattern for the embodiment of FIG. 1.
Figure 5:
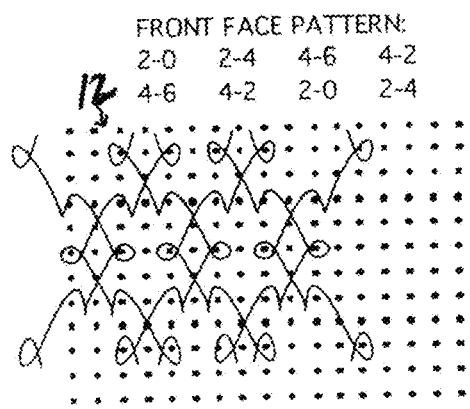
FIG. 5 is the knit pattern for the front face of the fabric of FIG. 1.
Figure 6:
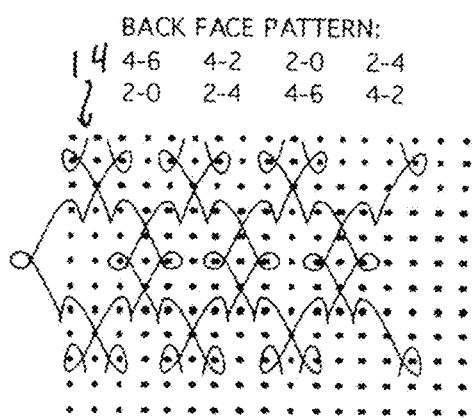
FIG. 6 is the knit pattern for the back face of the fabric of FIG. 1.
Figure 7:
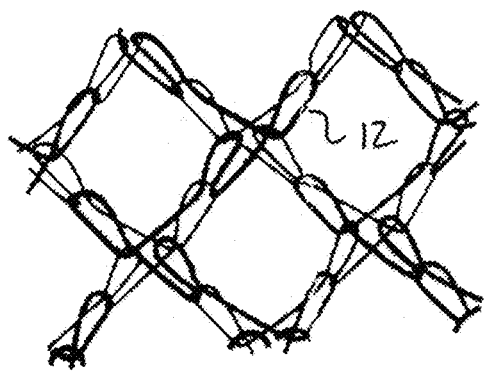
FIG. 7 is a representation of the resulting fabric structure formed from the knit pattern of FIG. 4.

By utilizing its three-dimensional structure, the fabric 10 allows one face to lie directly on an object while maintaining an interposed convecting air layer between the lower face and the upper face. The upper surface of the camouflage textile fabric 10 does not correspond to the temperature or color of the underlying object. Therefore, the spaced multi-layer structure of the textile fabric 10 contributes to concealment when draped over an object by disrupting visual and heat detection of the underlying object by sensors. The preferred knit patterns required to provide substantially identical but offset front and back faces and overlapping pile yarns between the faces are illustrated in FIGS. 4-6. FIG. 4 represents a composite of the three knit patterns utilized to obtain the textile fabric of FIG. 1. FIGS. 5 and 6 respectively detail the knit patterns of the front face 12 and the back face 14 where the apexes of one face would appear in the open area of the other face. FIG. 7 represents the openwork fabric structure achieved from the knit patterns. Different knit patterns can be used to produce a fabric with less or more open area, depending on the degree of camouflage effect and solar loading required.

The radar/microwave detection avoidance capability of the inventive camouflage textile 10 can be augmented by contribution of fabric spacing; "tuning." "Tuning" (carefully selecting the spacing), the knit fabric and the pile promote enhanced concealment against selected radio frequencies, and particularly frequencies in the microwave/radar range. Where the spacing of the yarns corresponds to particular radio frequency wavelengths, the fabric, itself, may contribute to frequency cancellation. Frequency cancellation may be achieved by dimensioning the fabric spacing to correspond to an odd number of quarter-wavelengths where the waves are reflected within the weave and tend to cancel some of the incoming wave energy. The particular structure and composition of the textile 10 will determine the degree of cancellation attained due to the spacing within each sheet, the degree of offset of the sheets, and the separation of the sheets due to the length of the pile yarns 18. For example, where those spaces correspond to an odd number of quarter wavelengths of a selected frequency in upper sheet 12, the offset lower sheet 14 possesses differently sized openings, the length of the pile yarns 18 correspond to a third wavelength, RF attenuation can be achieved for several frequencies. The reduction in apparent RF reflection or transmission will be measurable particularly when the respective yarns incorporate scattering, resistive, or reflective components (metallized filaments and the like).

In the illustrated embodiment, polymeric threads and yarns use to form the face sheets 12 and 14 are preferred such as polyesters, polyamide, etc. Most preferred are textured polyester yarn of approximately 50-75 deniers to form the two faces. The connecting pile yarn 18 is a 50-75 denier polyester monofilament which not only provides stiffness and strength but also contributes to basic radar attenuation. In a preferred construction, the pile yarn 18 is a carbonized yarn that exhibits adequate conductivity combined with an anti-static polyester yarn to provide additional radar attenuation.

In addition to the knit patterns described above, alternate but effective knit patterns may be employed for the facing sheets. Likewise, different machine settings and different knitting machines may be used. Differing the machine settings of the knit structure can increase or decrease the camouflage effect of the fabric while simultaneously changing the physical parameters (weight, occlusion, etc.) of the fabric. Also establishing the greige fabric during the heat-setting of the polymer (polyester) knit structure alters the properties of the resulting three-dimensional fabric. Instead of the double needle bed warp or two bed flat bar knitting machine preferred in the practice of this invention, a Raschel warp knitting machines such as that described in U.S. Pat. No. 5,385,036 (incorporated herein by reference) may be employed to produce a spacer fabric.

In addition to affecting the physical properties of the fabric, the selection of the particular yarns and filaments control the appearance and weight of the fabric. It is preferred that the camouflaging textile 10 of this invention is a lightweight fabric (135-170 gm/m$^2$ or 4-5 oz/yd$^2$). For example instead of a heavier, circular yarn (mono or multifilament), substitution of a flat, textured yarn for the faces permit the use of a yarn of lesser mass (lighter) yarn to provide substantially similar camouflaging/occlusion performance but facilitate transportation and handling because the camouflaging fabric is lighter.

Likewise, substitution of polyamide yarns and substituted aromatic polymer-based yarns for conventional polyesters, may significantly change the properties of the strength, weight, and chemical properties of the fabric. Examples of such yarns are the well-known polyamide yarns such as Nomex® or Kevlar®. Incorporating newly developed bonded but unwoven or knitted polymer fabrics may also reduce weight and bulk without sacrificing performance.

Given the foregoing, variations and modifications to the invention should now be apparent to a person having ordinary skill in the art. These variations and modifications are intended to fall within the scope and spirit of the invention as defined by the following claims.

I claim:

1. A camouflage textile providing multi-spectral electromagnetic detection resistance, comprising:
    a first textile sheet defined by a first selected pattern of fibers, said first textile sheet comprising a visible pattern configured to maximize one or more optical characteristics configured to match with an ambient environment and to minimize a probability of visual observation, said first selected pattern of fibers forming a first grid of first selected dimensions;
    a second textile sheet generally parallel to, coextensive with, and spaced apart from said first textile sheet, said second textile sheet being defined by a second selected pattern of fibers forming a second grid of second selected dimensions;
    a third layer connecting to and separating said first textile sheet and said second textile sheet wherein said camouflage textile possesses a three dimensional configuration, wherein said third layer comprises fibers possessing sufficient stiffness to maintain a separation between said first textile sheet and said second textile sheet upon deployment of said camouflage textile adequate to permit air convection between said first textile sheet and said second textile sheet thereby enabling a diffusion of infrared radiation therebetween; and
    a radiofrequency (RF) detection attenuating means for minimizing detection by RF sensors.

2. The camouflage textile according to claim 1, wherein said first textile sheet and said second textile sheet are knitted, said first selected pattern of fibers of said first textile sheet is substantially the same as said second selected pattern of fibers of said second textile sheet, and said third layer comprises a yarn.

3. The camouflage textile according to claim 2 wherein said first textile sheet and said second textile sheet are disposed so that said first selected pattern of fibers of said first textile sheet is center offset from said second selected pattern of fibers of said second textile sheet.

4. The camouflage textile according to claim 1 wherein said RF is in the microwave radar frequency range and said first selected dimensions of said first selected pattern of fibers is tuned to correspond to an odd number of quarter wavelength multiples of a selected one or more RF frequencies.

5. The camouflage textile according to claim 4 wherein said second selected dimensions of said second selected pattern of fibers correspond to odd numbers of quarter wavelengths of a selected one or more frequencies and cooperate with said first selected pattern of fibers to cancel transmission of certain RF frequencies.

6. A camouflage textile providing multi-spectral electromagnetic detection resistance, comprising:

a first textile sheet defined by a first selected pattern of fibers, said first textile sheet comprising a visible pattern configured to maximize one or more optical characteristics configured to match with an ambient environment and to minimize a probability of visual observation, said first selected pattern of fibers forming a first grid of first selected dimensions;

a second textile sheet generally parallel to, coextensive with, and spaced apart from the first textile sheet, said second textile sheet being defined by a second selected pattern of fibers forming a second grid of second selected dimensions;

a third layer connecting to and separating said first textile sheet and said second textile sheet wherein said camouflage textile possesses a three dimensional configuration, said third layer comprises fibers possessing sufficient stiffness to maintain adequate separation between said first textile sheet and said second textile sheet upon deployment of said camouflage textile to permit air convection between said first textile sheet and said second textile sheet thereby enabling a diffusion of infrared radiation therebetween; and a radiofrequency (RF) detection attenuating means configured to minimize a detection by RF sensors wherein said radiofrequency is in a microwave radar frequency range and said first selected dimensions of said first selected pattern of fibers is tuned to correspond to an odd number of quarter wavelength multiples of a selected one or more RF frequencies, wherein said second selected dimensions of said second selected pattern of fibers correspond to odd numbers of quarter wavelengths of said selected one or more RF frequencies and cooperate with said first selected pattern of fibers to cancel transmission of said one or more RF frequencies; and wherein said third layer is of a length selected to cooperate with said one or more RF frequency cancellation properties of said first textile sheet and said second textile sheet wherein said one or more RF frequencies are cancelled.

7. The camouflage textile according to claim 6 wherein said first textile sheet and said second textile sheet are made on a double needle bed warp knitting machine.

8. The camouflage textile according to claim 6 wherein said first textile sheet and said second textile sheet are flexible and said fibers of said third layer comprise stiffening filaments.

9. The camouflage textile according to claim 6 wherein said third layer comprises yarns formed from a radar attenuation material selected from the group consisting of an anti-static polyester monofilament, carbon filaments, electromagnetically conductive filaments, and conductive dipole materials.

10. The camouflage textile according to claim 6 wherein said fibers comprising said first textile sheet and said second textile sheet are composed of an anti-static polyester and said third layer comprises non-continuous metallic threads possessing conductive dipoles.

11. The camouflage textile according to claim 6 wherein said fibers of said third layer are coated with a low-emissivity material configured to lower an apparent temperature of said camouflage textile.

12. The camouflage textile according to claim 6 wherein said first textile sheet and said second textile sheet are disposed so that said first selected pattern of fibers is center-offset from said second selected pattern of fibers and said first textile sheet and said second textile sheet each comprises approximately 50-75 denier textured polyester yarn and said third layer comprises a 50-75 denier polyester monofilament.

13. The camouflage textile according to claim 6 wherein said first textile sheet and said second textile sheet are stiffened by including yarns selected from the group consisting of monofilament and multi-filament yarns.

14. The camouflage textile according to claim 6 wherein said fibers of said first textile sheet and said fibers of said second textile sheet are selected from the group consisting of polyester, polyamide, mixtures, and copolymers thereof.

15. The camouflage textile according to claim 6 having a weight of about 150 gm/m$^2$.

16. The camouflage textile according to claim 6 having a substantially uniform surface.

17. A method of producing a camouflage textile comprising:

weaving or knitting a camouflage textile, wherein said camouflage textile comprises:

a first textile sheet defined by a first selected pattern of fibers, said first textile sheet comprising a visible pattern configured to maximize one or more optical characteristics configured to match with an ambient environment and to minimize a probability of visual observation, said first selected pattern of fibers forming a first grid of first selected dimensions;

a second textile sheet generally parallel to, coextensive with, and spaced apart from the first textile sheet, said second textile sheet being defined by a second selected pattern of fibers forming a second grid of second selected dimensions;

a third layer connecting to and separating said first textile sheet and said second textile sheet wherein said camouflage textile possesses a three dimensional configuration, said third layer comprises fibers possessing sufficient stiffness to maintain adequate separation between said first textile sheet and said second textile sheet upon deployment of said camouflage textile to permit air convection between said first textile sheet and said second textile sheet thereby enabling a diffusion of infrared radiation therebetween; and a radiofrequency (RF) detection attenuating means configured to minimize a detection by RF sensors wherein said radiofrequency is in a microwave radar frequency range and said first selected dimensions of said first selected pattern of fibers is tuned to correspond to an odd number of quarter wavelength multiples of a selected one or more RF frequencies, wherein said second selected dimensions of said second selected pattern of fibers correspond to odd numbers of quarter wavelengths of said selected one or more RF frequencies and cooperate with said first selected pattern of fibers to cancel transmission of said one or more RF frequencies; and wherein said third layer is of a length selected to cooperate with said one or more RF frequency cancellation properties of said first textile sheet and said second textile sheet wherein said one or more RF frequencies are cancelled.

18. A method of using a camouflage textile comprising:

disposing a camouflage textile over an object, wherein said camouflage textile comprises:

a first textile sheet defined by a first selected pattern of fibers, said first textile sheet comprising a visible pattern configured to maximize one or more optical characteristics configured to match with an ambient environment and to minimize a probability of visual observation, said first selected pattern of fibers forming a first grid of first selected dimensions;

a second textile sheet generally parallel to, coextensive with, and spaced apart from the first textile sheet, said second textile sheet being defined by a second selected pattern of fibers forming a second grid of second selected dimensions;

a third layer connecting to and separating said first textile sheet and said second textile sheet wherein said camouflage textile possesses a three dimensional configuration, said third layer comprises fibers possessing sufficient stiffness to maintain adequate separation between said first textile sheet and said second textile sheet upon deployment of said camouflage textile to permit air convection between said first textile sheet and said second textile sheet thereby enabling a diffusion of infrared radiation therebetween; and a radiofrequency (RF) detection attenuating means configured to minimize a detection by RF sensors wherein said radiofrequency is in a microwave radar frequency range and said first selected dimensions of said first selected pattern of fibers is tuned to correspond to an odd number of quarter wavelength multiples of a selected one or more RF frequencies, wherein said second selected dimensions of said second selected pattern of fibers correspond to odd numbers of quarter wavelengths of said selected one or more RF frequencies and cooperate with said first selected pattern of fibers to cancel transmission of said one or more RF frequencies; and wherein said third layer is of a length selected to cooperate with said one or more RF frequency cancellation properties of said first textile sheet and said second textile sheet wherein said one or more RF frequencies are cancelled.

* * * * *